United States Patent [19]
Suzuki et al.

[11] Patent Number: 5,543,876
[45] Date of Patent: Aug. 6, 1996

[54] CAMERA

[75] Inventors: Tatsuya Suzuki, Tokyo; Shunji Matsutani, Akishima; Yukihiko Sugita, Hachioji; Moriya Katagiri, Tachikawa; Manabu Ikeda, Machida, all of Japan

[73] Assignee: Olympus Optical Co., Ltd., Tokyo, Japan

[21] Appl. No.: 227,726

[22] Filed: Apr. 14, 1994

[30] Foreign Application Priority Data

Apr. 19, 1993 [JP] Japan .................................. 5-091522
Apr. 28, 1993 [JP] Japan .................................. 5-102145

[51] Int. Cl.⁶ ......................... G03B 15/05; G03B 17/02
[52] U.S. Cl. .................... 354/149.11; 354/288
[58] Field of Search ..................... 354/64, 145.1, 354/149.11, 288, 484

[56] References Cited

U.S. PATENT DOCUMENTS

| | | | |
|---|---|---|---|
| 4,166,680 | 9/1979 | Maitani | 354/145.1 |
| 4,502,768 | 3/1985 | Tsuji et al. | 354/145.1 |
| 4,945,368 | 7/1990 | Ishino et al. | 354/149.11 |

FOREIGN PATENT DOCUMENTS

| | | |
|---|---|---|
| 116332 | 8/1980 | Japan . |
| 98836 | 7/1985 | Japan . |
| 100739 | 7/1985 | Japan . |
| 98835 | 7/1985 | Japan . |

*Primary Examiner*—A. A. Mathews
*Attorney, Agent, or Firm*—Louis Weinstein

[57] ABSTRACT

The present invention provides a waterproof camera having a sealed strobe movable between a flashing position and a non-flashing position and a sealed camera body having a larger volume than the strobe. The waterproof camera further comprises a capacitor for storing charge used to flash a strobe unit, a switch fitted in guide ditches on a barrier cover, which is used to detect that the strobe does not lie between the flashing position and the non-flashing position, with a barrier member between them, a capacitor discharge resistor for removing charge from the capacitor according to the output of the switch, a terminal and a connector pin for coupling the strobe with the capacitor so that the strobe and capacitor can be decoupled from each other freely in the camera, and for decoupling the capacitor from the strobe when the strobe moves to a position except those positions between the flashing position and non-flashing position, and a hollow tube for providing an air passage between the camera body and the sealed strobe.

26 Claims, 3 Drawing Sheets

CAMERA

BACKGROUND OF THE INVENTION

1. Field of the Invention

The present invention relates to a camera, or more particularly, to a camera having waterproofness and allowing a strobe unit to move between a flashing position and a non-flashing position while being in use.

2. Description of the Related Art

In the past, various proposals have been made for a waterproof camera having a strobe unit and including a strobe movable between a flashing position that is a use position and a non-flashing position that is a storage position. For example, Japanese Utility Model Unexamined Publication No. 60-98835, 60-98836, or 60-100739 has described a waterproof camera with a built-in strobe unit in which a strobe of the strobe unit and a camera body are mutually coupled using a hollow pipe waterproofed with an elastic material, a lead wire lies through the hollow pipe so as to connect the strobe of the strobe unit with an electric circuit in the camera body, and the strobe of the strobe unit is movable between a storage position and a projected position for use.

Japanese Utility Model Unexamined Publication No. 55-116332 has described a safety circuit for an electronic flash unit comprising a flash tube, an ignition capacitor, a quenching circuit that allows capacitor discharge current to flow out of the flash tube when coupled with the ignition capacitor, and a safety circuit. In the electronic flash unit, a switch in the safety circuit can be set to a stationary non-actuation position and an actuation position at which a strobe housing member moves with respect to the switch. When the switch is set to the circuit actuation position, the quenching circuit is energized in order to discharge the ignition capacitor.

The camera described in the Japanese Utility Model Unexamined Publication No. 60-98835, 60-98836, or 60-100739 has a structure that a lead wire passes through a hollow, waterproof pipe. This structure requires a large space for connections, which poses a hindrance to downsizing of the camera. In an attempt to avoid this problem, the lead wire may not lie through the hollow pipe and the strobe has a waterproof structure independently of the camera body. In this case, since the strobe of the strobe unit is fully sealed, when the strobe unit is flashed continuously, heat generated during flashing causes the internal pressure of the strobe to rise. This causes a waterproof seal to be destroyed.

As for the camera having the quenching circuit described in the Japanese Utility Model Unexamined Publication No. 55-116332, a control circuit or the like is required. The invention disclosed in the publication is therefore hard to apply to low-priced cameras.

OBJECTS AND SUMMARY OF THE INVENTION

A first object of the present invention is to provide a camera offering high safety.

A second object of the present invention is to provide a camera having high reliability.

A third object of the present invention is to provide a camera offering high safety and being capable of preventing occurrence of an electric shock.

A fourth object of the present invention is to provide a camera having good waterproof qualities.

A fifth object of the present invention is to provide a camera that prevents occurrence of an electric shock even when a strobe enters an abnormal state.

A sixth object of the present invention is to provide a camera in which continuous flashing does not cause an internal pressure of a strobe to rise.

A seventh object of the present invention is to provide a camera in which even when a strobe unit is flashed continuously, an internal pressure of a strobe does not rise and waterproofness is not impaired.

An eighth object of the present invention is to provide a camera offering a high level of safety and being capable of preventing occurrence of an electric shock when a strobe does not lie between a flashing position and a non-flashing position.

Briefly, the present invention relates to a camera comprising a camera body, a strobe for emitting flashlight, an electric circuit arranged in the camera body for supplying power to the strobe, and a connecting means arranged in the camera body for electrically connecting the strobe with the electric circuit in the camera body. The connecting means releases electrical connection between the strobe and electric circuit when the strobe comes off from the camera body.

The above, as well as other objects and advantages of the present invention, will be further apparent from the detailed description set forth below.

DETAILED DESCRIPTION OF THE PREFERRED EMBODIMENTS

An embodiment of the present invention will be described with reference to the drawings.

Figure 1:
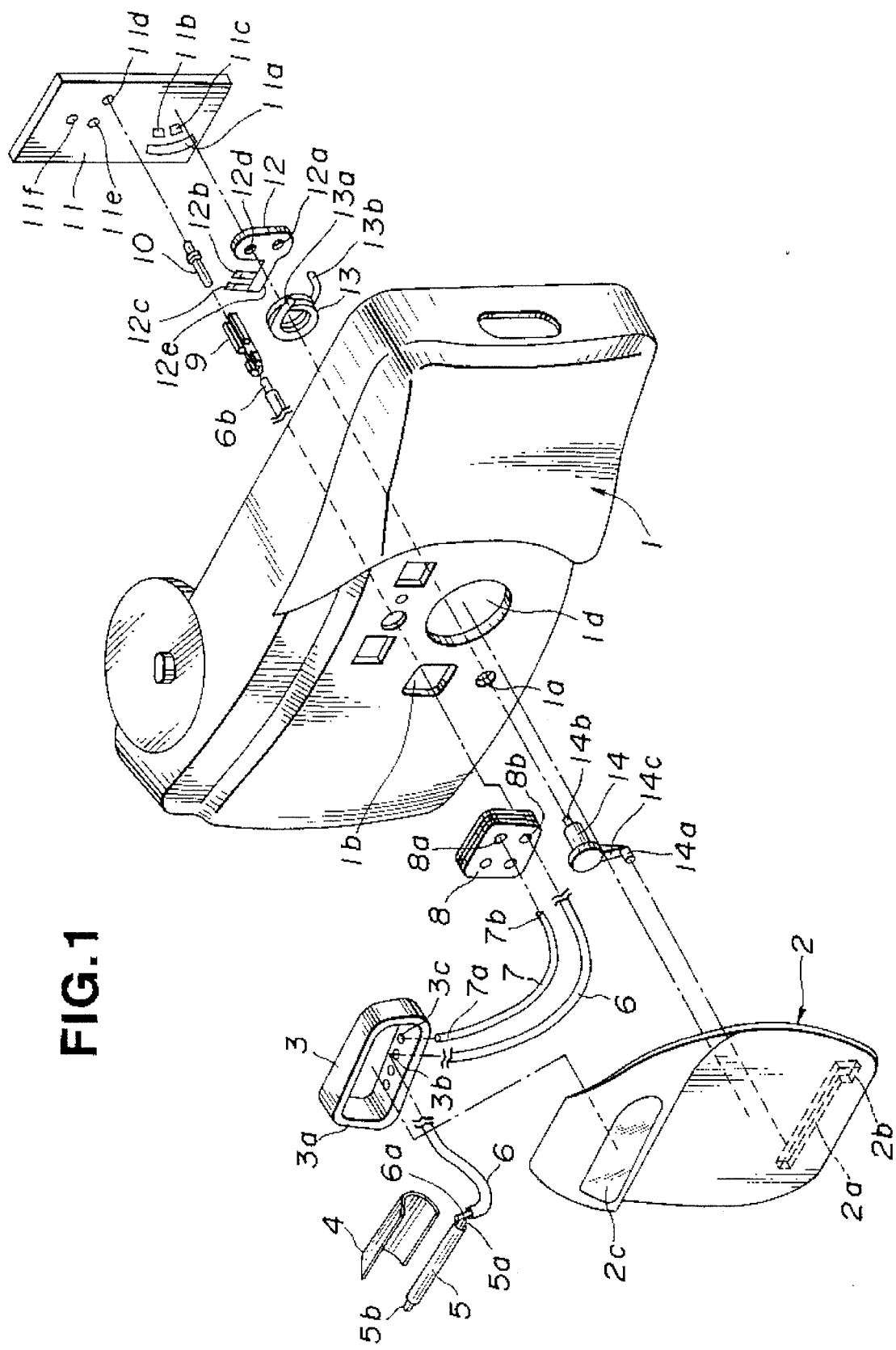
FIG. 1 is an exploded oblique view of a major section of a waterproof camera having a strobe unit according to one embodiment of the present invention.

FIG. 1 is an exploded oblique view showing a major section of a waterproof camera with a built-in strobe unit according to one embodiment of the present invention. The waterproof camera with a built-in strobe unit has the front hair thereof shielded with a front cover 1 and the back half thereof shielded with a back cover which is not shown. The front and back covers are coupled with each other in a watertight manner, which provides the camera with a waterproof structure.

The front cover 1 shields the front of a camera body which is not shown. A barrier cover 2 is fitted in guide ditches bored on the front cover 1 so as to slide freely therealong. The front cover 1 has a round hole 1d in which an optical system, which is not shown, is embedded. In the left-hand vicinity of the round hole 1d in FIG. 1, a lead wire insertion hole 1b shaped substantially like a rectangle and sized to prevent entry of a finger is present. A barrier axis mounting hole 1a is located in the lower portion of cover 1 in the vicinity of the lead wire insertion hole 1b. Moreover, a range finding window, a photometry window, and others are formed in the upper portion of cover 1 in the vicinity of the round hole 1d. A barrier member 14 is fitted in the barrier member mounting hole 1a in a watertight manner so as to be freely rotatable.

The barrier member 14 has an arm 14c extending laterally from the frontal end thereof. A pin 14a projects in a forward direction and extends along the optical axis of the camera from a tip of the arm 14c. The barrier cover 2 is mounted on the front cover 1 with the pin 14a fitted in key-shaped guide ditches 2a and 2b bored on the lower part of the reverse side of the barrier cover 2.

A back end 14b of the barrier member 14 lying through the barrier member mounting hole 1a is fitted into a hole 12d, whereby a switch 12 is united with the back end 14b. A torsion spring 13 is interposed coaxially with the barrier member 14 between the switch 12 and front cover 1. One end 13a of the torsion spring 13 is restrained from moving by a stopper 1c (See FIG. 3) formed on the reverse side of the front cover 1. The other end 13b thereof is inserted in a hole 12a bored in the switch 12.

The switch 12 is used to select either a capacitor discharge resistor 15 (See FIG. 2), which will be described later, or a CPU for connection with switch 12. The switch 12 has an arm 12e extending substantially along a radius of a circle having the hole 12d as a rotation center. Two contacts 12b and 12c project substantially in parallel with each other from one side of arm 12e.

A substrate 11 having patterns 11a, 11b, and 11c positioned coincidentally with the contacts 12b and 12c is mounted on a camera body, which is not shown, and located behind the switch 12 in the front cover 1. To be more specific, the patterns 11b and 11c are short patterns curved coincidentally with an arc having a rotation center at a position opposed to the hole 12d of the switch 12. The pattern 11a is an arc-shaped contact pattern located outside the patterns 11b and 11c. When the switch 12 rotates with the rotation of the barrier member 14, the contact 12b lying inward or near the rotation center slides along the patterns 11b and 11c, and the contact 12c lying outward or away from the rotation center slides along the pattern 11a.

The substrate 11 has a mounting hole 11d into which a connector pin 10 is fitted as well as mounting holes 11e and 11f into which two similar connector pins, which are not shown, are fitted.

The barrier cover 2 has a flashing window 2c for a strobe unit arranged in the upper part thereof. A strobe cover member 3 constructing a strobe is located behind the flashing window 2c and mounted on the barrier cover 2 by attaching a front edge 3a of the member 3 to the inner side of cover 2. A known flashtube 5 and a known reflector 4 are stowed in the strobe cover member 3.

One electrode terminal 5a of the flashtube 5 is solder-connected to one end 6a of a lead wire 6 coated with an insulating material. The lead wire 6 extends through a hole bored on the bottom of the strobe cover member 3 so as to pass out of the strobe cover member 3. The hole 3b through which the lead wire 6 extends is sealed in a fully watertight manner using a rubber member or any other elastic member which is not shown.

The lead wire 6 extending out of the strobe cover member 3 is pressed into a hole 8b of an elastic member 8, which is pressed into the lead wire insertion hole 1b on the front cover 1, in a watertight manner, and routed into the front cover 1. Using a terminal 9 attached to the other end 6b of the lead wire 6 by performing soldering or the like, the lead wire 6 is engaged with the connector pin 10 so as to be disengaged from it freely. Thus, electrical connection is attained.

The other terminal 5b of the flashtube 5 and the reflector 4 are also coupled to lead wires which are not shown, and thus electrically connected to connector pins, which are not shown, on the substrate 11 via holes bored on the strobe cover member 3 and holes bored on the elastic member 8. The lead wires are elaborated similarly to the lead wire 6.

A hole 3c is bored on the bottom of the strobe cover member 3. One end 7a of a hollow tube 7 is fitted into the hole 3c while being sealed with a rubber member or any other waterproof elastic member which is not shown. The other end 7b thereof is pressed into a hole 8a of the elastic member 8, and routed into the front cover 1. Thus, the hollow tube 7 allows the inside of the strobe cover member 3 to communicate with the interior of the camera body and provides an air passage.

Figure 2:
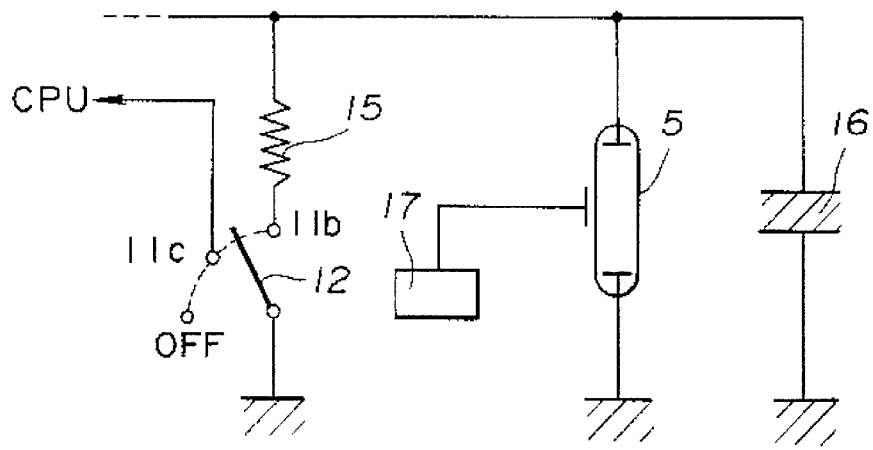
FIG. 2 is an electric circuit diagram showing a relationship between a switch and a strobe unit in the waterproof camera of the embodiment in FIG. 1.

FIG. 2 is an electric circuit diagram showing a relationship between the switch 12 and strobe unit.

The flashtube 5 is, as already described, connected to a capacitor 16 and a trigger circuit 17. The pattern 11b on the substrate 11 along which the contact 12b of the switch 12 slides is connected to the capacitor discharge resistor 15, and the pattern 11c thereon is connected to the main CPU. The contact 12c, which slides along the pattern 11a, serves as a common contact. When the contact 12b touches the pattern 11c and the contact 12c touches the pattern 11a, the power supply of the camera is turned on. When the contact 12b rests on any place other than the pattern 11c, the power supply of the camera is turned off.

Figure 3:
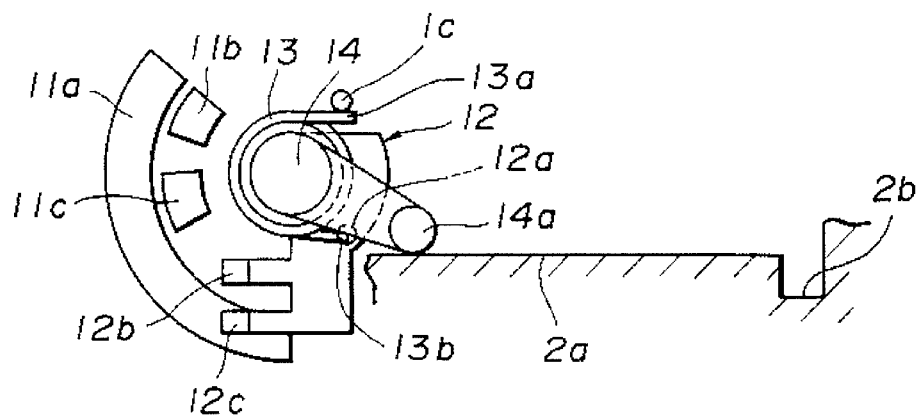
FIG. 3 is a front view showing a barrier axis, a switch and patterns on a substrate in a situation that a barrier cover of the waterproof camera of the embodiment in FIG. 1 is closed.
Figure 4:
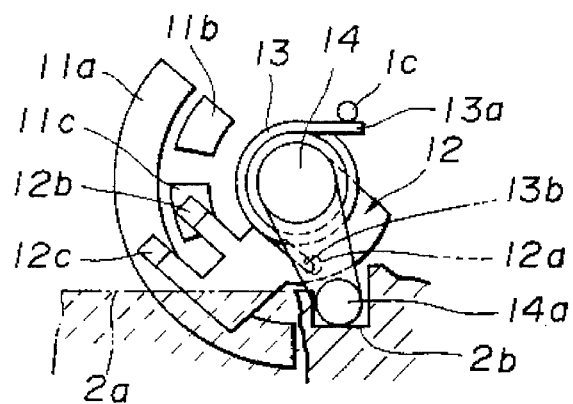
FIG. 4 is a front view showing the barrier axis, switch, and patterns in the substrate in a situation that the barrier cover of the waterproof camera of the embodiment in FIG. 1 is open.
Figure 5:
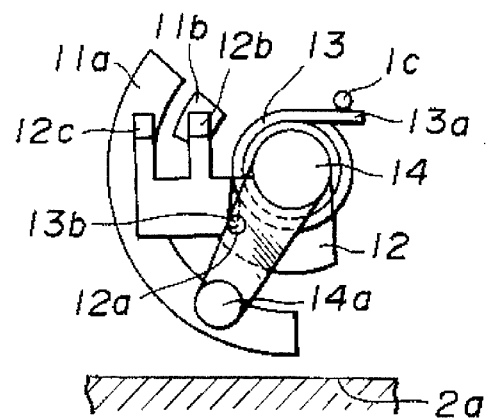
FIG. 5 is a front view showing the barrier axis, switch, and patterns in the substrate in a situation that the barrier cover of the waterproof camera of the embodiment in FIG. 1 is off.

FIGS. 3, 4, and 5 are front views showing the barrier member 14, switch 12, and patterns 11a, 11b, and 11c in respective situations that the barrier cover 2 is closed, open, and off.

The torsion spring 13, which is incorporated in a charged state, forces the switch 12 and barrier member 14 to rotate clockwise in FIG. 3 (or FIG. 1). When the camera is not used and the barrier cover 2 is closed, the torsion spring 13 forces the pin 14a of the barrier axis 14 to abut on the guide ditch 2a extending horizontally along the barrier cover 2. At this time, the contact 12b of the switch 12 is, as shown in FIG. 3, not in contact with any pattern including the pattern 11c on the substrate 11. The power supply of the camera is therefore off, whereby the capacitor 16 is not charged.

Next, when the barrier cover 2 slides to open so that the camera can be used, as shown in FIG. 4, the pin 14a of the barrier member 14 enters the guide ditch 2b extending vertically along the barrier cover 2 and the barrier axis 14 rotates clockwise in FIG. 3 (or FIG. 1) by a certain angle. This causes the switch 12 united with the barrier member 14 to rotate clockwise. The contact 12b then touches the pattern 11c on the substrate 11. The power supply of the camera is turned on, whereby the capacitor 16 is charged.

When charge of the capacitor 16 is completed, stroboscopic photography can be performed. Even when stroboscopic photography is performed continuously, since the inside of the strobe and the inside of the camera body are allowed to communicate mutually owing to the hollow tube 7 that provides an air passage, the internal pressure of the strobe will not rise due to heat generated by the flashtube 5. Consequently, a waterproof seal will not be destroyed.

After the aforesaid charge of the capacitor 16 is completed, for example, if a photographer drops a camera, the barrier cover 2 may come off from the front cover 1, or if a photographer intends to disassemble a camera, the barrier cover 2 may be removed. In this case, the photographer may directly touch the lead wire 6 used for electrical connection of the strobe or the other two lead wires which are not shown. As already known, the flashtube 5 is energized with high voltage of, normally, several hundreds of volts stored in the capacitor 16 in the strobe unit. When a photographer touches the lead wire 6 or the like, the photographer may get an electric shock. This is very dangerous.

As a countermeasure, the camera of the aforesaid embodiment of the present invention has a safety precaution. That is to say, when the barrier cover 2 comes off, as shown in FIG. 5, the barrier member 14 is no longer restrained by the guide ditches 2a and 2b on the barrier cover 2. The barrier member 14 and switch 12 therefore further rotate clockwise in FIG. 5 due to the force of the torsion spring 13. This causes the contact 12b of the switch 12 to engage the pattern 11b on the substrate 11. The pattern 11b is connected to the capacitor discharge resistor 15 (See FIG. 2). Charge in the capacitor 16 is therefore removed via the capacitor discharge resistor 15. Thus, an electrical shock can be avoided.

In the meantime, the contact 12b does not rest on the pattern 11c. The power supply of the camera is therefore turned off, whereby charge is not restarted. Instead of the aforesaid method of discharging the capacitor 16 using the capacitor discharge resistor 15, of course, the discharge may be achieved by causing the strobe to flash.

Figure 6:
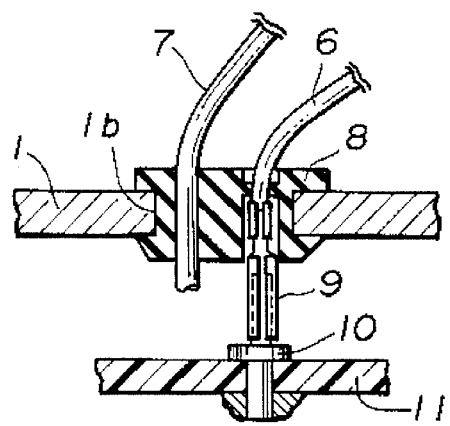
FIG. 6 is an enlarged sectional view showing a lead wire insertion hole on a front cover in a normal use state of the waterproof camera of the embodiment in FIG. 1.

The camera of the aforesaid embodiment of the present invention has another safety precaution in addition to the aforesaid one. The safety precaution will be described with reference to FIG. 6. FIG. 6 is a sectional view showing the lead wire insertion hole 1b on the front cover 1 in a normal use state.

Figure 7:
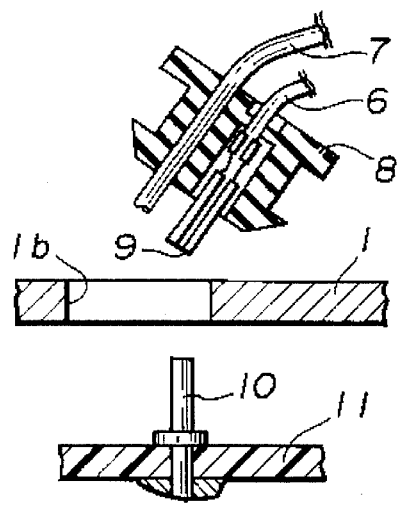
FIG. 7 is an enlarged sectional view showing the lead wire insertion hole on the front cover when the barrier cover comes off and unnatural force is applied in the waterproof camera of the embodiment in FIG. 1.

When the barrier cover 2 comes off, if a photographer applies force toward separating the barrier cover 2 from the front cover 1 deliberately or by accidentally hooking the barrier cover 2, as shown in FIG. 6 or 7, the terminal 9 is disengaged from the front cover 1 and connector pin 10 together with the elastic member 8 (See FIG. 7). This means that even if unnatural force is imposed on the barrier cover 2, the lead wire 6 will not be broken at a location intermediate its ends.

Furthermore, since the connector pin 10 lies in the front cover 1 and the lead wire insertion hole 1b has, as mentioned above, a diameter not permitting entry of a finger, a photographer cannot touch electric conductors including the connector pin 10. A photographer will therefore never get an electric shock by touching any of these electric conductors.

As mentioned above, in the present embodiment, a double safety mechanism is realized using technologies of discharging a capacitor and connecting connectors. Needless to say, only one of the technologies may be used to exert the effect of avoiding the risk of an electric shock.

When a camera has a waterproof structure, a strobe is made by fixing the strobe cover member 3 accommodating the flashtube 5, reflector 4, and others to the barrier cover 2. This structure makes the strobe watertight. In this case, when the strobe is flashed continuously, the temperature in a sealed space rises to increase the internal pressure. If the pressure causes the seal of the strobe to break, water invades into the strobe. As a result, the strobe cannot flash. Moreover, a risk of getting an electric shock will emerge.

In this embodiment, the sealed space in the strobe communicates with the space in the front cover 1 via the hollow tube 7 so that an air passage between the waterproof strobe and the camera interior is realized. An increase in the internal pressure of the sealed space in the strobe can be absorbed owing to the space in the front cover 1 having a larger volume than the sealed space. The waterproof seal of the strobe will therefore not be destroyed.

In the present invention, it will be apparent that a wide range of different working modes can be formed on the basis of the invention without departing from the spirit and scope of the invention. This invention is limited only to the appended claims and is not restricted to any specified embodiment.

What is claimed is:

1. A camera, comprising:

said camera being shielded by at least a front cover member;

a strobe mounted to slide along an exterior of said cover and to reciprocate between a first position at which flashing is enabled and a second non-flashing position separated by a predetermined distance from said first position;

a control means provided in said camera and causing said strobe to emit flashlight at said first position;

a charge storing means provided in said camera for storing charge for use in emitting flashlight; and means for electrically connecting said strobe with said charge storing means when said strobe moves between said first and second positions, said means for connecting including releasable means positioned between an inward surface of said front cover and said charge storing means and which is easily separated for releasing electrical connection between said strobe and said charge storing means only when said strobe moves to a location beyond said first and second positions.

2. A camera according to claim 1 wherein said front cover has an opening for receiving a camera optical system;

said strobe moving along a direction transverse to a central axis of said opening when moving between said first and second positions.

3. A camera, comprising:

a camera shield including a front cover;

a moving member slidably mounted along an exterior of said front cover to reciprocate between a first position and a second position separated by a predetermined distance from said first position;

a strobe arranged on said moving member and moveable therewith for emitting flashlight directed away from said camera body;

a control means provided in said camera and causing said strobe to emit flashlight when said moving member is at said first position;

a charge storing means provided in said camera for storing charge for use in emitting flashlight; and means for electrically connecting said strobe with said charge storing means in said camera when said moving member moves between said first and second positions, said means for connecting including releasable means easily separated for releasing electrical connection between said strobe and said charge storing means when said strobe moves to a location beyond said first and second positions.

4. A camera according to claim 3 wherein said front cover is provided with an opening for receiving a camera optical system; and said moveable member covering said opening when moved to said second position and uncovering said opening when moved to said first position.

5. A camera according to claim 3 wherein said moveable member is slidable to cover an opening in said front cover for receiving a camera optical system, and is provided with a window to pass light emitted from the strobe.

6. A camera, comprising:

a shield for the camera, including a front cover;

a strobe for emitting flashlight arranged to move along an exterior of said front cover;

a charge storing means provided in said camera for storing charge for use in emitting flashlight; and means for electrically connecting said strobe with said charge storing means in said camera, said means for connecting including releasable means easily separated for releasing the electrical connection between said strobe and said charge storing means only when said strobe is removed from said camera front cover.

7. A camera, comprising:

a shield for the camera including at east a front cover;

a strobe for emitting flashlight;

a charge storing means provided in said camera for storing charge for use in emitting flashlight;

a first connector means located inward of said front cover and fixedly connected to said charge storing means; and a second connector means fixedly connected to said strobe and having an end extending into a through-hole bored in said front cover and releasably coupled with said first connector means at a location inside said front cover;

said first and second connector means being decoupled only when said strobe is removed from said front cover.

8. A camera, comprising:

a shield for the camera including at least a front cover;

a strobe for emitting flashlight;

a charge storing means provided in said camera for storing charge for use in emitting flashlight;

a first connector means located inward of said front cover and connected to said charge storing means; and a second connector means connected to said strobe and coupled with said first connector means via a through-hole bored in said front cover;

said first and second connector means being decoupled when said strobe is removed from said front cover;

said first connector means comprising a connector pin provided in said camera, and said second connector means comprising a terminal to be releasably engaged with said connector pin.

9. A camera according to claim 8, wherein said connector pin is arranged in said camera so as not to project beyond said outer wall of said camera.

10. A camera, comprising:

a shield for said camera including at least a front cover;

a moving member mounted to move along an exterior of said front cover;

a strobe for emitting flashlight arranged on said moving member;

a charge storing means provided in said camera for storing charge for use in emitting flashlight;

a first connector means located inward of said front cover and connected to said charge storing means; and a second connector means connected to said strobe and having an end extending into a through-hole bored in said front cover and releasably coupled to said first connector means;

said first and second connector means being decoupled only when said moving member is removed from said camera body.

11. A camera, comprising:

a shield for said camera including at least a front cover;

a strobe movable along an exterior of said front cover between a flashing position for emitting flashlight during photography and a non-flashing position separated by a given distance from said flashing position;

a charge storing means for storing charge for use in emitting flashlight;

a detecting means for detecting the position of said strobe; and a discharging means for discharging said charge storing means according to an output of said detecting means representing movement of the strobe away from said front cover.

12. A camera, comprising:

a shield for said camera including a front cover;

a strobe movable along an exterior of said front cover between a flashing position for emitting flashlight during photography and a non-flashing position separated by a given distance from said flashing position;

said strobe being mounted on a cover moveable to a first position for covering an opening in the front cover provided for receiving a camera optical system when the strobe is in the non-flashing position and moveable to a second position for uncovering said opening when the strobe is in the flashing position;

a charge storing means provided in said camera for storing charge for use in emitting flashlight; and means for electrically connecting said strobe with said charge storing means when said strobe is moved between said flashing and non-flashing positions, said connecting means including releasable coupling means in said camera whereby said strobe and said charge storing means can be decoupled from each other; said releasable coupling means releasing only when said strobe moves to a position other than the positions between said flashing position and said non-flashing position.

13. A camera according to claim 12, wherein said shield is a waterproof shield.

14. A camera according to claim 13, wherein an air passage means is provided between said camera body and said strobe to equalize internal pressure between said camera and said strobe.

15. A camera according to claim 12, wherein said coupling means is stowed in said shield to prevent the coupling means from being touched by an operator's body from a position outside the camera shield.

16. A camera according to claim 14, wherein said camera shield has a larger volume than a volume of said strobe.

17. A camera, comprising:

a shield for said camera including a front cover;

a strobe movable along an exterior of said front cover between first and second positions, said strobe being sealed so as to be watertight; and a tubular air passage means lying between said front cover and said strobe for coupling interiors of said camera and said strobe;

one end of said tubular means being fixedly and watertightly coupled to a surface of the strobe by first coupling means and an opposite end of said tubular means being water-tightly secured to said front cover by second coupling means, the first and second ends of the tubular means being moveable relative to one another when said strobe moves between said first and second positions;

said camera having a volume larger than a volume of said strobe and being sealed so as to be watertight, whereby said air passage means enables a pressure equalization between an interior of said camera body and an interior of said strobe.

18. A camera according to claim 17 wherein said second coupling means is releasably mounted in an opening in said front cover and is released from said front cover only when said strobe is displaced a given distance from said front cover.

19. A camera with a built-in strobe unit, comprising:

a movable member resting on an exterior of a casing of a camera and arranged to move over a given distance, said movable member including said strobe unit;

means holding said movable member so that said movable member can move; and means for electrically connecting an electrical terminal in said camera with said strobe unit, and including releasable means for releasing an electrical connection between said terminal and said strobe unit only when said moveable member is removed from said camera body, said electrical terminal and releasable means being located in said camera and shielded from an exterior side of said casing.

20. A camera, comprising:

a shield for said camera including a front cover;

a strobe mounted to reciprocate along said front cover between a first position and a second position separated by a predetermined distance from said first position;

an electric circuit provided in said camera; and means for electrically connecting said strobe with said electric circuit when said strobe moves between said first and second positions, said electrical connecting means including releasable means in said camera for releasing electrical connection between said strobe and said electric circuit only when said strobe moves to a position beyond said first and second positions.

21. A camera, comprising:

a shield for said camera including a front cover;

a strobe for emitting flashlight arranged on an exterior of said front cover;

an electric circuit provided in said camera for supplying power to said strobe; and means for electrically connecting said strobe with said electric circuit when said strobe is on said front cover, said connecting means including releasable means in said camera for releasing electrical connection between said strobe and said electric circuit only when said strobe is removed from said front cover.

22. A camera, comprising:

a shield for said camera including a front cover;

a moving member slidably mounted along an exterior of said front cover to reciprocate between a first position and a second position separated by a predetermined distance from said first position;

a strobe arranged on said moving member;

an electric circuit provided in said camera; and means for electrically connecting said strobe with said electric circuit when said moving member moves between said first and second positions, including releasing means in said camera for said connecting means releasing electrical connection between said strobe and said electric circuit only when said strobe is moved to a position beyond said first and second positions.

23. A camera, comprising:

said camera being shielded by at least a front cover member;

a strobe mounted to reciprocate between a first position and a second position separated by a predetermined distance from said first position;

a control means provided in said camera and causing said strobe to emit flashlight at said first position;

a charge storing means provided in said camera for storing charge for use in emitting flashlight; and connecting means provided in said camera for electrically connecting said strobe with said charge storing means, said connecting means including releasable means between said front cover and charge means for releasing electrical connection between said strobe and said charge storing means when said strobe moves to a location other than said first and second positions;

said connecting means comprising a switch arm movable between a first position for releasing electrical connection between said strobe and said charge storing means and a second position for electrically connecting said strobe with said charge storing means;

bias means normally urging said switch arm toward said second position; and means for blocking said switch arm from moving toward said second position when said strobe is in said first position and for releasing said switch arm to move toward said second position when said strobe is moved to said second position.

24. A camera according to claim 23 wherein said means for controlling the position of said switch arm comprises cam means movable with said strobe.

25. A camera comprising:

a shield for said camera including a front cover having an opening for receiving a camera optical system;

a cover member slidably mounted upon an exterior surface of said front cover;

a strobe mounted to said cover member;

said cover member being slidable between a first position uncovering said opening and a second position covering said opening;

a control circuit for controlling said strobe arranged in said camera;

detection means for detecting movement of said cover member to said first position for electrically coupling said control means to said strobe; and responsive to movement of said cover member to a second position for disconnecting said control means from said strobe.

26. A camera according to claim 25 wherein said control means includes a charge storing means in said camera coupled to said strobe;

said detection means for discharging said charge storing means responsive to removal of said cover member from said front cover.

* * * * *